Patented Feb. 13, 1951

2,541,140

UNITED STATES PATENT OFFICE 2,541,140

CERAMIC INSULATING BODIES AND METHOD OF MAKING

Jack Woodcock, Stourport, and John K. Paridge, Bewdley, England, assignors to Steatite and Porcelain Products Limited, a corporation of Great Britain No Drawing. Application July 28, 1947, Serial No. 764,238. In Great Britain June 19, 1946

Section 1, Public Law 690, August 8, 1946
Patent expires June 19, 1966

17 Claims. (Cl. 106—39)

This invention relates to ceramic insulating bodies of the kind comprising essentially titania and also magnesia and zirconia.

It has already been proposed to provide condensers having as dielectric material bodies of the kind described containing zirconia in amounts of from five to fifty per cent of the titania content.

According to the present invention we provide improved ceramic insulating bodies of the kind comprising essentially titania, containing zirconia in amounts of between 0.25 and 5% of the titania content and magnesia in amounts of between 0.1 and 1.25% of the titania content, the magnesia content being at least the stoichiometric equivalent of the zirconia content in magnesium zirconate $MgZrO_3$. Optionally bodies in accordance with the invention may also contain one or more alkalie earth oxides (i. e. other than magnesia) in amounts which, expressed as the corresponding alkaline earth titanate or titanates, do not exceed singly or collectively 25% of the body weight.

The bodies in accordance with the invention may optionally also include other oxides, for example oxides of tungsten and/or molybdenum up to about 3% of either or both together, and/or alumina or silica or both, added in the form of talc, soapstone, bentonite or other materials commonly used as fluxes. The titania may be present substantially all in the uncombined state, or partially or completely in the combined state as magnesium ortho-titanate, $2MgO\cdot TiO_2$, or partially combined with alkaline earth oxides as titanates and partially uncombined or combined as magnesium titanate. Thus for example a body in accordance with the invention may comprise substantially only titania with magnesia and zirconia in stoichiometric proportions corresponding to from .33–6.6% magnesium zirconate. Alternatively instead of the titania being present in the body substantially completely in the uncombined state, it may be partially or completely combined with magnesium as titanate. Bodies in accordance with the invention may also contain minor amounts of magnesia in excess of that combined with zirconia and titania, as for example where a flux containing magnesia combined therein is employed to facilitate the process of firing the body.

It will be understood therefore that the present invention contemplates bodies of the kind described in which the titania is substantially completely uncombined, or is partially or completely combined with magnesia as magnesium titanate, or is partially combined with calcium and/or strontium and/or barium oxide or oxides equivalent to not more than 25% in all of alkaline earth titanate or titanates, titania in excess of that combined as alkaline earth titanate being either substantially free or partially or completely combined with magnesia. Bodies in accordance with the invention are produced in the customary way by first preparing a slip from which the bodies are formed and fired. In preparing the slip for the production of bodies in accordance with the invention, the zirconia and magnesia may be added separately as such or as pre-fired magnesium zirconate. Where additional magnesia or other alkaline earth oxide is to be present in the body, that also may be added as the oxide or as the pre-fired titanate. In place of the respective oxides, any other compound capable of producing the oxide without residue under firing conditions may be added to the slip, as for example the carbonates of magnesium and the alkaline earths.

The following examples will serve to illustrate various bodies which may be produced and methods of producing them in accordance with the invention.

Example I

A mix is prepared comprising

| | Parts by weight |
|---|---|
| $TiO_2$ | 97 |
| $MgZrO_3$ | 3 |

The magnesium zirconate is pre-formed by calcining a mixture of magnesia and zirconia. The titania/zirconate mixture is milled with water, dried, and then mixed with an organic plasticiser, which is subsequently burned out in firing (e. g. flour paste). The plastic mass is shaped by extrusion or other forming processes commonly known in the industry to form tubes, plates or other articles, which after drying out are fired at a temperature of about 1400° C.

Example II

A mix is prepared comprising

| | Parts by weight |
|---|---|
| $TiO_2$ | 96 |
| $MgO$ | 0.75 |
| $ZrO_2$ | 2.25 |
| $WO_3$ | 1 |

The oxides are wet-mixed and milled and treated as in Example I.

Example III

A mix is prepared comprising

| | Parts by weight |
|---|---|
| TiO$_2$ | 48 |
| MgO | 49 |
| ZrO$_2$ | 2 |

These oxides are wet-mixed and milled, and the resulting slip is treated as in Example I.

Example IV

A mix is prepared comprising

| | Parts by weight |
|---|---|
| TiO$_2$ | 96.75 |
| MgCO$_3$ (magnesite) | 0.5 |
| ZrO$_2$ | 0.75 |
| Bentonite | 2 |

The titania, magnesite and zirconia are mixed with water and milled, and the bentonite is added to the resulting slip. The bentonite acts as a plasticiser for the unfired material, and as a flux in the firing operation.

Example V

A mix is prepared comprising

| | Parts by weight |
|---|---|
| TiO$_2$ | 85 |
| BaO | 12 |
| MgZrO$_3$ | 3 |
| MoO$_3$ | 1 |

The oxides, and pre-formed magnesium zirconate are wet-milled and the slip so produced is treated as in Example I.

Example VI

A mix is prepared comprising

| | Parts by weight |
|---|---|
| TiO$_2$ | 86.5 |
| BaCO$_3$ | 7 |
| SrCO$_3$ | 5.7 |
| MgZrO$_3$ | 4 |

The oxide carbonate and zirconate are wet-mixed, milled and the slip so produced is treated as in Example I.

Example VII

A mix is prepared comprising

| | Parts by weight |
|---|---|
| TiO$_2$ | 82.5 |
| BaTiO$_3$ | 8.5 |
| CaTiO$_3$ | 6 |
| MgZrO$_3$ | 3 |

These ingredients are wet-mixed and milled and further processed as in Example I.

The improved electrical properties associated with bodies in accordance with the present invention are thought, without prejudice to the invention, to result from the presence in the bodies of magnesium zirconate (MgO.ZrO$_2$) in amounts corresponding to the zirconia/titania proportions hereinbefore specified. The optimum zirconia content appears to be from about 1 to 4 parts zirconia per 100 parts titania. The present invention possesses also the great advantage that bodies can be produced thereby which can be fired without fluxing at usual firing temperatures, and which consequently have inherently lower power factor than other titania bodies which require fluxing. Moreover, the magnesium zirconate, even in the minimum amounts within the ambit of the invention, exercises a pronounced inhibiting effect on the tendency of titania to assume the well-known conducting form, and in the larger amounts completely inhibits this tendency even in circumstances which otherwise would strongly favour the formation of the conducting form.

In the following table, the electrical properties of the bodies resulting from some of the exemplary mixes detailed hereinbefore are set out in comparison with other titania bodies typical of those known prior to our invention.

| | Dielectric constant | Power Factor×10$^{-4}$ | |
|---|---|---|---|
| | | at low frequency | at high frequency |
| Standard high titania bodies. | 80+ | 40-300+ | usually 7-10, occasionally 5. |
| High titania bodies with other oxides, e. g. tungstic oxide. | 80+ | 10-30 | 3-5. |
| Titania/magnesia/zirconia bodies hitherto known. | 20-70 | 10-30 | 5-10. |
| Body, Example I | 92 | 3 | less than 1. |
| Body, Example II | 90 | 4.5 | Do. |
| Body, Example III | 15 | 5 | Do. |
| Body, Example IV | 90 | 4 | Do. |

We claim:

1. A ceramic insulating body consisting essentially of titania, magnesia, and zirconia, in which the zirconia content is from 0.25 to 5% of the titania content and the magnesia content is from 0.1 to 125% of the titania content, the magnesia content being at least the stoichiometric equivalent of the zirconia content.

2. A body as claimed in claim 1 in which the titania is present substantially all in the free state and the magnesia and zirconia are present in stoichiometric proportions corresponding to from .33–6.6% magnesium zirconate on the body weight.

3. A body as claim in claim 1 in which the titania is present partially in the combined state as magnesium titanate.

4. A body as claimed in claim 1 in which the titania is present substantially all in the combined state as magnesium titanate.

5. A method of producing ceramic insulating bodies which comprises preparing a slip consisting essentially of titania, magnesia, and zirconia, in which the zirconia content is from 0.25 to 5% of the titania content and the magnesia content is from 0.1 to 125% of the titania content, the magnesia content being at least the stoichiometric equivalent of the zirconia content, forming said slip into the desired shape and subsequently firing the slip.

6. A method as claimed in claim 5, wherein the magnesia and zirconia are added to the slip as prefired magnesium zirconate.

7. A method as claimed in claim 5 wherein the titania is added to the slip in combination with magnesia as a preformed titanate.

8. A body as claimed in claim 1 wherein the titania is partially present in the combined state as the titanate of an alkaline earth metal selected from the group consisting of calcium, barium, and strontium, the total amount of such titanates not exceeding 25% of the weight of said body.

9. A body as claimed in claim 8 wherein the titania in excess of that combined as alkaline earth titanates is substantially in the free state.

10. A body as claimed in claim 1 wherein the titania is partially present in the combined state as the titanate of an alkaline earth metal selected from the group consisting of calcium, barium and strontium, the total amount of such titanates not exceeding 25% of the weight of said body and the titania in excess of that combined as such alkaline earth titanates is wholly present in the combined state as magnesium titanate.

11. A body as claimed in claim 1 wherein the titania is partially present in the combined state as the titanate of an alkaline earth metal selected from the group consisting of calcium, barium and strontium, the total amount of such titanates not exceeding 25% of the weight of said body and the titania in excess of that combined as such alkaline earth titanates is partially present in the combined state as magnesium titanate.

12. A ceramic insulating body consisting essentially of titania, magnesia, and zirconia, in which the zirconia content is from 0.25 to 5% of the titania content and the magnesia content is from 0.1 to 125% of the titania content, the magnesia content being at least the stoichiometric equivalent of the zirconia content, and containing up to about 3% by weight of said body of tungsten oxide.

13. A ceramic insulating body consisting essentially of titania, magnesia, and zirconia, in which the zirconia content is from 0.25 to 5% of the titania content and the magnesia content is from 0.1 to 125% of the titania content, the magnesia content being at least the stoichiometric equivalent of the zirconia content, and containing up to about 3% by weight of said body of molybdenum oxide.

14. A ceramic insulating body consisting essentially of titania, magnesia, and zirconia, in which the zirconia content is from 0.25 to 5% of the titania content and the magnesia content is from 0.1 to 125% of the titania content, the magnesia content being at least the stoichiometric equivalent of the zirconia content, and containing up to about 3% by weight of said body of tungsten and molybdenum oxides.

15. A ceramic insulating body consisting essentially of titania, magnesia, and zirconia, in which the zirconia content is from 0.25 to 5% of the titania content and the magnesia content is from 0.1 to 125% of the titania content, the magnesia content being at least the stoichiometric equivalent of the zirconia content, and containing a substantially lesser amount of a fluxing agent selected from the group consisting of alumina and silica.

16. A method as claimed in claim 5, wherein a part of the titania is added to the slip as a preformed titanate of an alkaline earth metal selected from the group consisting of calcium, strontium and barium, the total amount of such titanates in said slip not exceeding 25% of the weight of said body.

17. A method as claimed in claim 5 wherein the magnesia is added to the slip as magnesium carbonate.

JACK WOODCOCK.
JOHN K. PARIDGE.

REFERENCES CITED

The following references are of record in the file of this patent:

UNITED STATES PATENTS

| Number | Name | Date |
|---|---|---|
| 2,069,903 | Soyck | Feb. 9, 1937 |
| 2,402,516 | Wainer | June 18, 1946 |
| 2,402,517 | Wainer | June 18, 1946 |